US012668171B2

(12) United States Patent
El Far et al.

(10) Patent No.: US 12,668,171 B2
(45) Date of Patent: Jun. 30, 2026

(54) RELEASABLE ATTACHMENT FOR A LAMP IN A VEHICLE

(71) Applicant: Rivian IP Holdings, LLC, Irvine, CA (US)

(72) Inventors: Baha Jehad Husni El Far, Irvine, CA (US); Stephen Kowal, Allen Park, MI (US); Curtis Mcnamara, Livonia, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/505,025

(22) Filed: Nov. 8, 2023

(65) Prior Publication Data

US 2025/0145079 A1      May 8, 2025

(51) Int. Cl.
   B60Q 1/04          (2006.01)
(52) U.S. Cl.
   CPC .................................. B60Q 1/0491 (2013.01)
(58) Field of Classification Search
   CPC .................................................... B60Q 1/0491
   See application file for complete search history.

(56) References Cited

U.S. PATENT DOCUMENTS

| | | | | |
|---|---|---|---|---|
| 4,118,765 | A * | 10/1978 | Atsuchi .................. | B60Q 1/068 |
| | | | | 362/465 |
| 5,165,775 | A * | 11/1992 | Lisak ................... | B60Q 1/0683 |
| | | | | 362/524 |
| 8,720,975 | B1 * | 5/2014 | Perez ................... | B60Q 1/0495 |
| | | | | 296/187.04 |
| 9,073,478 | B2 * | 7/2015 | Krajenke ............. | B60Q 1/0491 |
| 9,221,387 | B1 * | 12/2015 | Thorpe ................ | B60Q 1/0495 |
| 9,463,834 | B2 * | 10/2016 | Brueckner ........... | B62D 65/024 |
| 2003/0142503 | A1 * | 7/2003 | Ericsson .............. | B60Q 1/0064 |
| | | | | 362/487 |
| 2013/0088886 | A1 * | 4/2013 | Eckert .................. | B60Q 1/0441 |
| | | | | 362/523 |
| 2014/0169020 | A1 * | 6/2014 | Aquilina .............. | B60Q 1/0483 |
| | | | | 362/523 |

* cited by examiner

*Primary Examiner* — Tsion Tumebo
(74) *Attorney, Agent, or Firm* — BAKERHOSTETLER

(57) ABSTRACT

An apparatus secured to a lamp of a vehicle is designed to release the lamp upon impact to the lamp. The apparatus may secure with a lamp housing as well as with a front end module of a vehicle. The apparatus may include a fastener that secures with the lamp housing. When the lamp is impacted, the fastener may shear (e.g., break), thus allowing displacement of the headlamp. As a result, pedestrians and/or objects impacting the lamp are less likely to incur damage. Moreover, the lamp is less likely to be damaged, and may be reinstalled when the fastener is replaced.

20 Claims, 10 Drawing Sheets

400

PROVIDE A SLIDE CONFIGURED TO
SECURE WITH A HOUSING

402

PROVIDE A CONNECTOR THAT COUPLES
TO THE SLIDE, WHEREIN THE
COMPENSATOR CONFIGURED TO
COUPLE THE SLIDE WITH A MODULE

404

PROVIDE A FASTENER CONFIGURED TO
EXTEND INTO AN OPENING OF THE
HOUSING TO SECURE THE SLIDE

406

RELEASABLE ATTACHMENT FOR A LAMP IN A VEHICLE

INTRODUCTION

Vehicles may include multiple lamps to provide illumination around the vehicle during, for example, instances of relatively low visibility. Some vehicles may include multiple lamps, including two front lamps and a center lamp.

SUMMARY

The subject technology is directed to lamps in vehicles, and more particularly, to attachments that secure headlamps to a vehicle while also allowing movement of the headlamp in the event of impact to the headlamp. The attachment may take the form of an apparatus that includes a base, or base mechanism, designed to engage a housing of the headlamp. The attachment may further include a connector (e.g., tolerance compensator) designed to couple (e.g., secure) the attachment to a front end module of the vehicle. Additionally, the attachment may include a fastener (e.g., pin) that passes through an opening in the housing to secure the attachment to the housing. In the event of impact to the housing, the fastener may shear, or break, thus allowing the housing to move relative to the attachment (when affixed to the front end module). Beneficially, when the headlamp is impacted, the headlamp moves and provides less force (e.g., counterforce) to the impacted object, thus minimizing the likelihood of damage to the object. Moreover, the damage to the headlamp may be minimal, if any, and by replacing the fastener, the headlamp may be reinstalled in the vehicle.

According to one or more aspects of the present disclosure, an apparatus is described. The apparatus may include a base configured to secure with a guide of a housing. The apparatus may further include a connector coupled with the base. The connector may be configured to couple with a module. The apparatus may further include a fastener configured to extend into an opening of the housing to couple the base. In one or more implementations, in response to an applied force, the fastener may be configured to release the housing from the base. The fastener may include a pin configured to break in response to the applied force. The pin may be configured to break in response to contact with the housing. The base may cause the housing to move in a direction of the applied force. The connector may be configured to rotate and couple with a module fastener coupled to the module. The base may include an opening, and the fastener may be configured to pass through the opening. In response to the base being positioned in the guide, the opening of the base may be aligned with the opening of the housing. The housing may be configured to carry a light source.

According to one or more aspects of the present disclosure, a vehicle is described. The vehicle may include a front end module. The vehicle may further include a housing including an opening. The vehicle may further include an apparatus. The apparatus may include a base configured to couple with the housing. The apparatus may further include a connector coupled to the base. The connector may be configured to couple with the housing with the front end module. The apparatus may further include a fastener configured to extend into the opening to couple the base. The housing may further include a light source. The housing may further include a guide configured to receive the base. The guide may a first rail and a second rail, and the opening of the housing may be positioned between the first rail and the second rail. In response to an applied force, the fastener may be configured to release the housing from the base. The fastener may include a pin configured to break in response to the applied force. The pin may be configured to break in response to contact with the housing. The base may cause the housing to move in a direction of the applied force.

According to one or more aspects of the present disclosure, a method is described. The method may include providing a base configured to couple with a housing. The method may further include providing a connector that couples to the base. The connector may be configured to couple the base with a module. The method may further include providing a fastener configured to extend into an opening of the housing to couple the base. The method may further include in response to an applied force, releasing the housing from the base based on the fastener breaking from the applied force. The method may further include rotating the connector to couple with a module fastener coupled to the module. In one or more implementations, providing the base include forming the base to extend between a first rail and a second rail of the housing.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to an apparatus designed to couple a lamp (e.g., headlamp) to a vehicle. For example, an apparatus (representing one or more additional apparatuses) may secure a headlamp to a front end module of the vehicle. The apparatus may include a base that may be positioned within guides of a lamp housing. In order to couple with the front end module, the apparatus may include a compensator designed to couple with a fastener. The compensator may rotate toward the fastener to form a joint with the front end module. The compensator may account for gaps or spaces between the apparatus and the front end module. In order to affix, or further secure, the apparatus to the headlamp housing, the apparatus may include a fastener (e.g., pin) positioned in an opening of the housing. When the headlamp undergoes impact, the headlamp may be displaced. The displacement causes the lamp, including the lamp housing, to contact and shear the fastener. As a result, the apparatus releases the housing, thus allowing the housing to move. In the event of impact from a pedestrian, the apparatus is designed to limit or prevent injury to pedestrians in the event of contact between a vehicle and a pedestrian. In particular, the apparatus may reduce the severity of the impact to the pedestrian. Beneficially, lamps shown and/or described herein may reduce or prevent injury, and as a result, may increase the safety rating of a vehicle. Moreover, various objects (e.g., bicycles, powered two-wheel vehicles, another vehicle, a stationary object) that provide an applied force may sustain less impact. Moreover, damage to the lamp may be reduced or prevented, and when a new fastener is replaces the sheared fastener, the lamp may be reinstalled in the vehicle.

Figure 1:
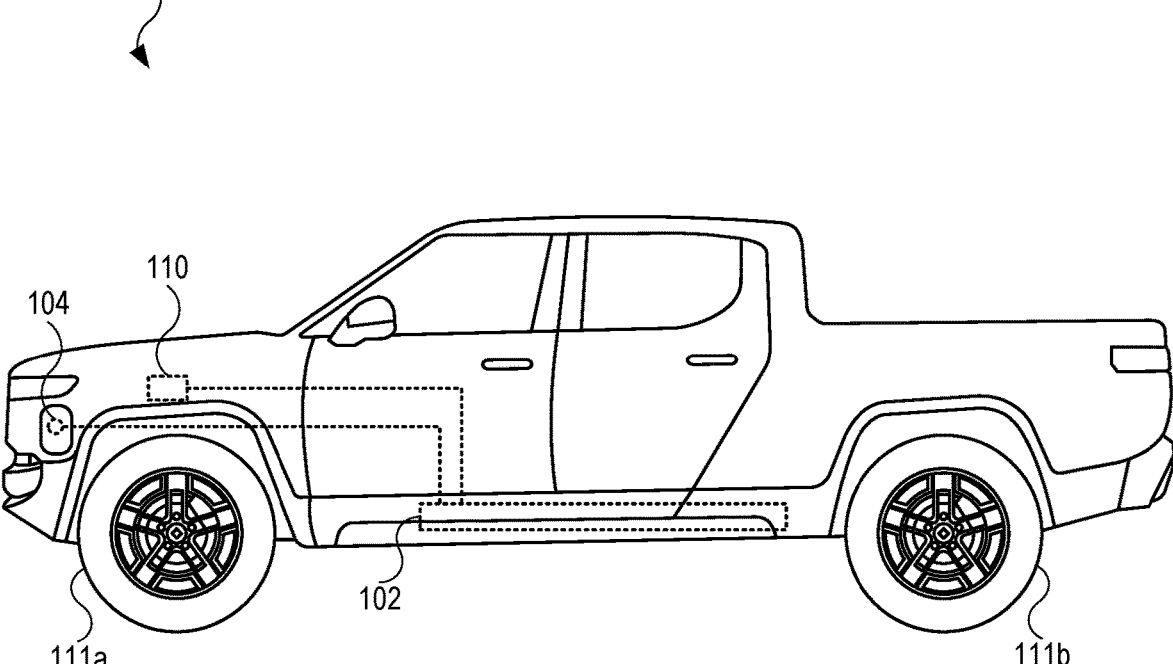
FIG. 1 illustrates an example of a vehicle, in accordance with aspects of the present disclosure.

FIG. 1 illustrates an example of a vehicle 100, in accordance with aspects of the present disclosure. In one or more implementations, the vehicle 100 is a sport utility vehicle (SUV). In the example shown in FIG. 1, the vehicle 100 is a truck. Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The battery pack 102 may couple to a drive unit 110, representative of one or more drive units of the vehicle 100. While the drive unit 110 is shown as generally being in the front of the vehicle 100, the drive unit 110 may located in the rear of the vehicle 100. Further, when multiple drive units are used, at least one drive unit may be in the front of the vehicle to drive the front wheels (e.g., wheel 111a), and at least one drive unit may be in the rear of the vehicle to drive the rear wheels (e.g. wheel 111b). The drive unit 110 may include, for example, a motor, an inverter, a gear box, and a differential. In the example shown in FIG. 1, the drive unit 110 takes the form of an electric motor. In this regard, the drive unit 110a may use energy (e.g., electrical energy) stored in the battery pack 102 for propulsion in order to drive (e.g., rotationally drive) wheels of the vehicle 100.

Figure 2:
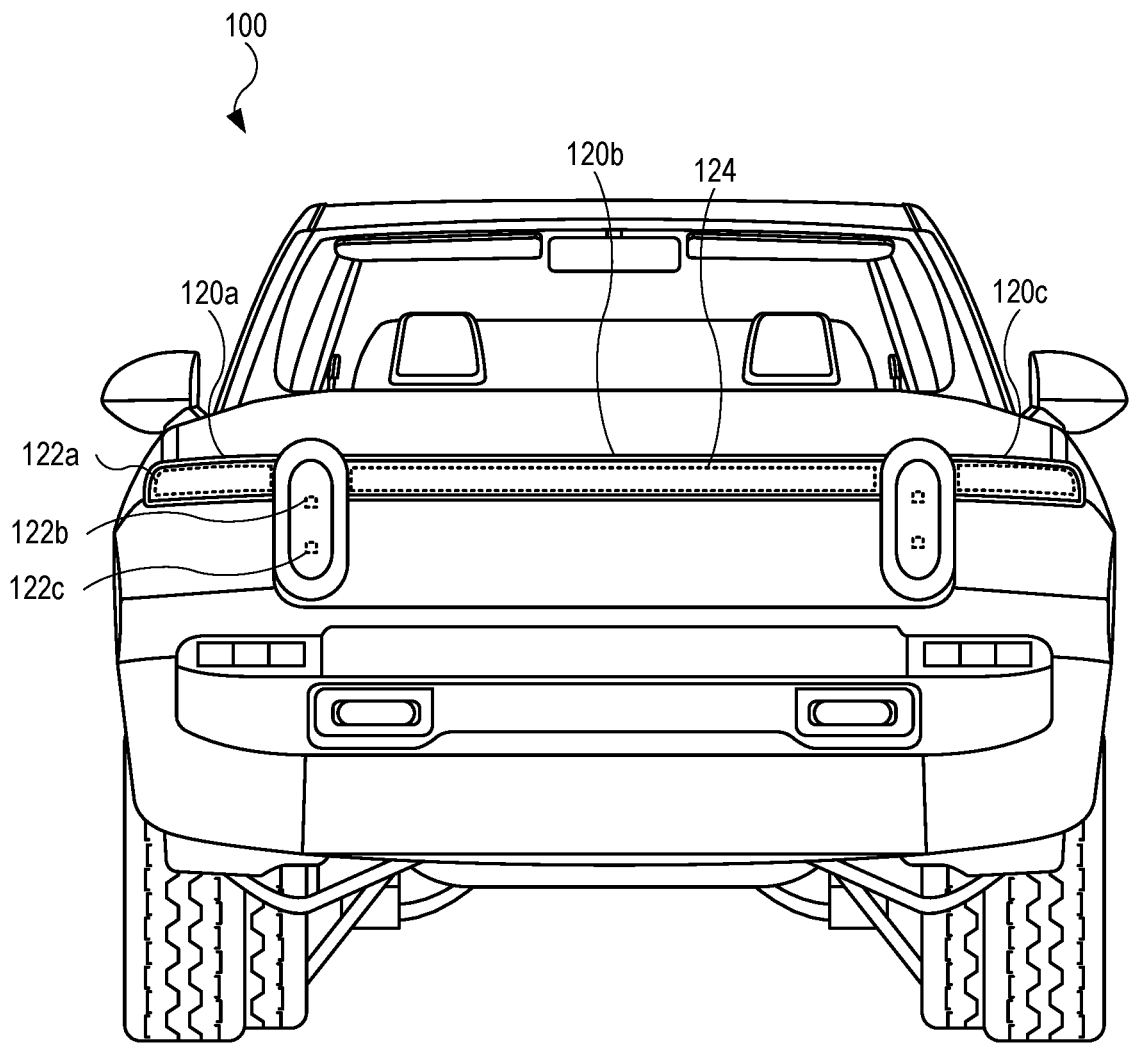
FIG. 2 illustrates a front view of a vehicle, in accordance with aspects of the present disclosure.

FIG. 2 illustrates a front view of the vehicle 100, in accordance with aspects of the present disclosure. The vehicle 100 may include several lamps. For example, in one or more implementations, the vehicle 100 includes a lamp 120a, a lamp 120b, and a lamp 120c. Each of the lamps 120a, 120b, and 120c may include one or more lights sources designed to illuminate and increase visibility for passengers of the vehicle 100. For example, the lamp 120a includes a light source 122a, a light source, 122b, and a light source 122c. The light sources 122a, 122b, and 122c may be representative of additional light sources for the lamp 120a as well as for the lamp 120c. Also, the lamp 120b may include a light source 124 representative of one or more light sources. Each of the described light sources may take the form of a light-emitting diode (LED) or an incandescent bulb, as non-limiting examples. The lamps 120a and 120c may be referred to as headlights or headlamps, and the lamp 120b may be referred to as a center lamp. The vehicle 100 may further include a power supply (not shown in FIG. 2), such as a battery pack, which provides energy (e.g., electrical energy) that causes the light sources 122a, 122b, 122c, and 124 to illuminate.

Figure 3:
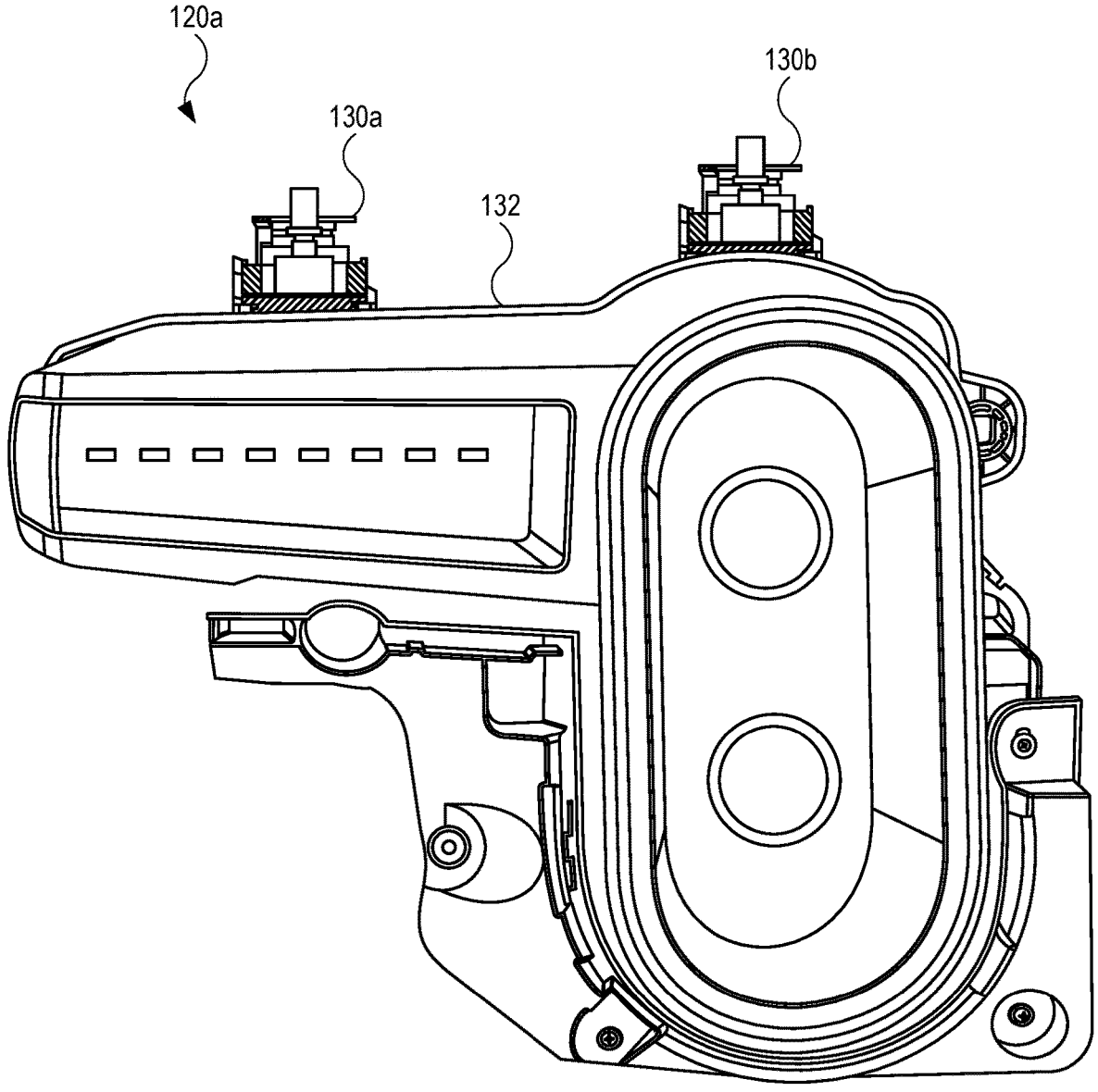
FIG. 3 illustrates a front perspective view of an example of a lamp, in accordance with aspects of the present disclosure.

FIG. 3 illustrates a front perspective view of an example of a lamp 120a, in accordance with aspects of the present disclosure. As shown, an apparatus 130a and an apparatus 130b are coupled to the lamp 120a. In particular, the apparatus 130a and the apparatus 130b are coupled to a housing 132 of the lamp 120a. The housing 132 is designed to carry the light source 122a (representative of several additional light sources), the light source 122b, and the light source 122c. The apparatus 130a and the apparatus 130b may secure the lamp 120a to a vehicle (e.g., vehicle 100 shown in FIG. 1). The lamp 120c, and in some cases, the lamp 120b (both shown in FIG. 2), may also include one or more apparatuses.

Figure 4:
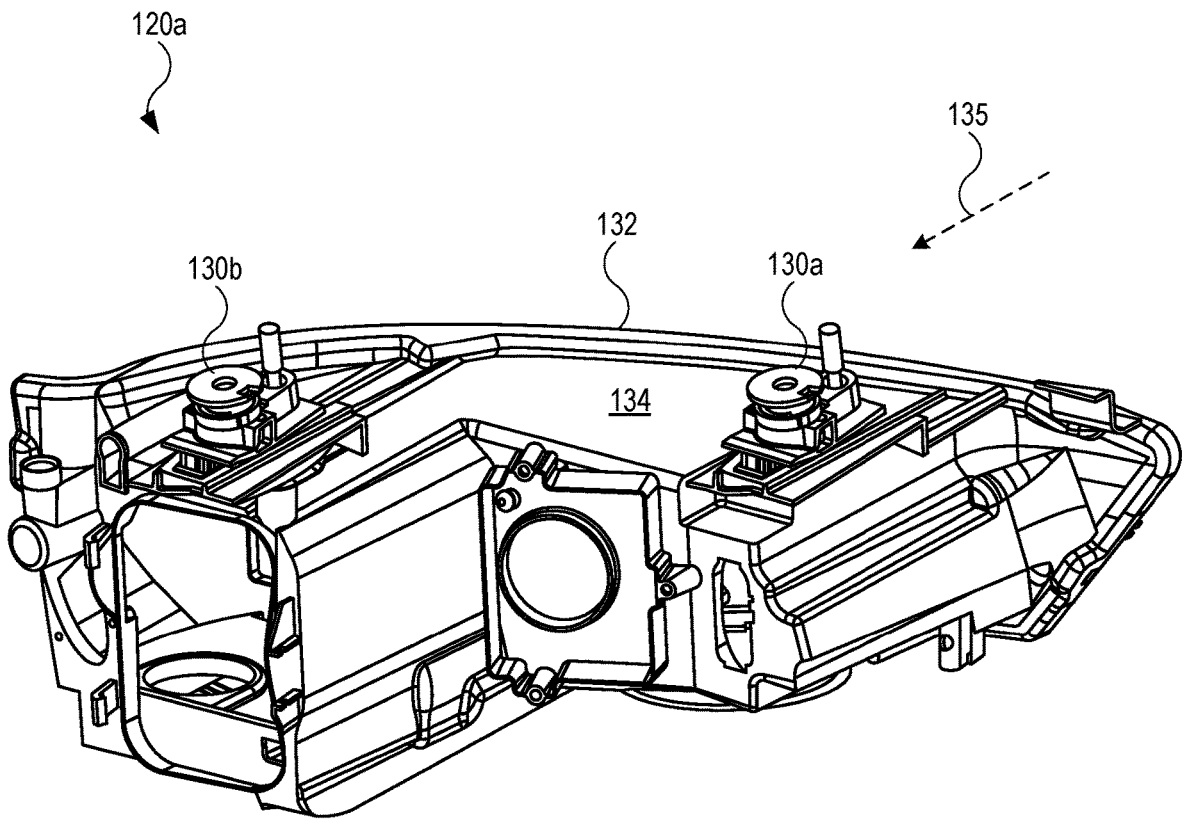
FIG. 4 illustrates a rear perspective view of a housing of a lamp, in accordance with aspects of the present disclosure.

FIG. 4 illustrates a rear perspective view of the housing 132 of the lamp 120a, in accordance with aspects of the present disclosure. The apparatus 130a and the apparatus 130b may secure with the housing 132 at a surface 134 of the housing 132, with the surface 134 generally representing an upper surface of the housing 132. While the apparatus 130a and the apparatus 130b may secure the lamp 120a to a vehicle, the apparatus 130a and the apparatus 130b may also be designed to release the lamp 120a, including the housing 132, in the event of an impact event to the lamp 120a. For example, when the impact event occurs in a direction of the arrow 135, each of the apparatus 130a and the apparatus 130b may release the lamp 120a, thus allowing displacement of the lamp 120a in the direction of the arrow 135. This will be shown in further detail below.

Figures 5, 6:
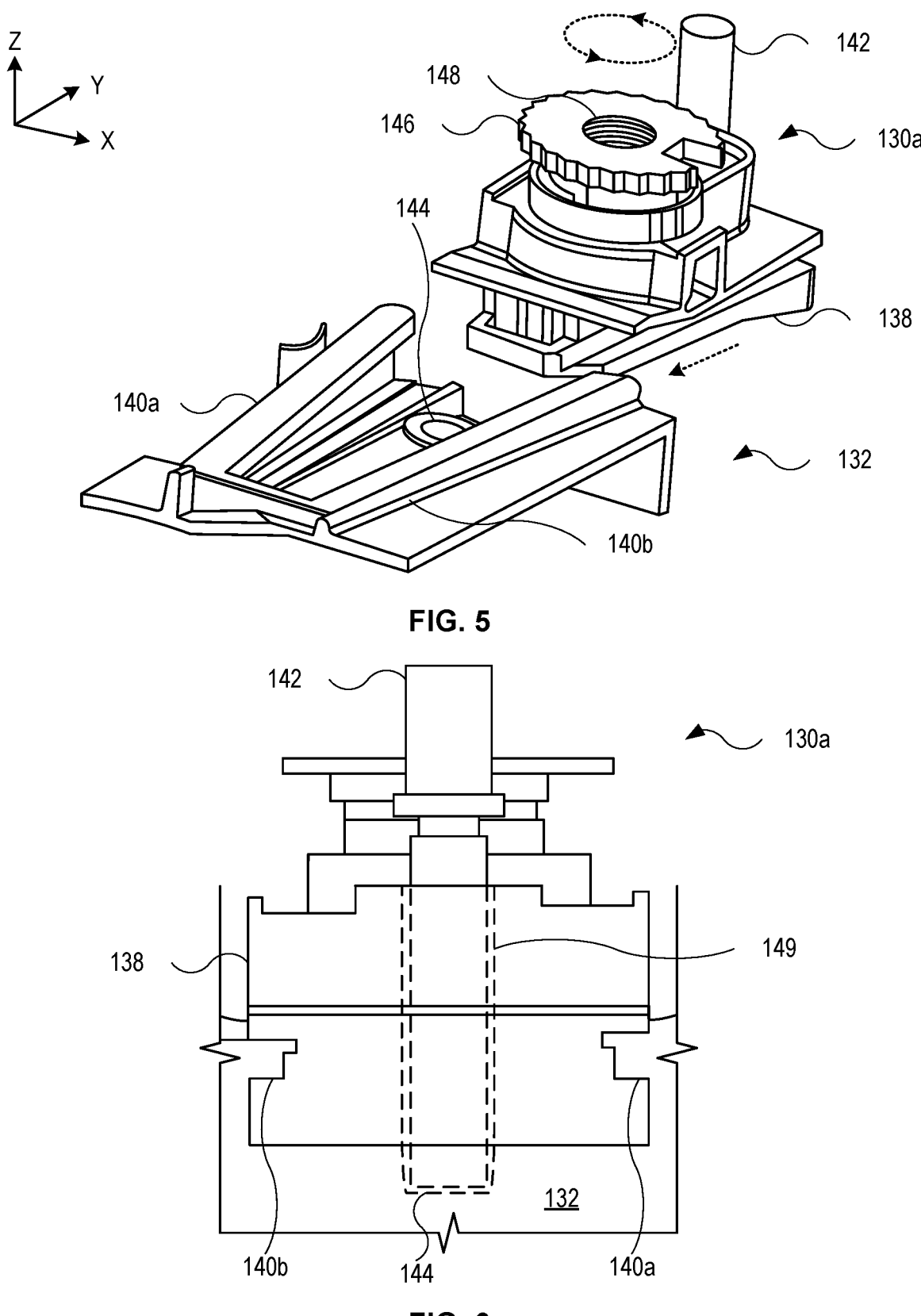
FIG. 5 illustrates a perspective view of an apparatus and features of the housing designed to receive the apparatus, in accordance with aspects of the present disclosure.
FIG. 6 illustrates a side view of an apparatus positioned in the guides, in accordance with aspects of the present disclosure.

FIG. 5 illustrates a perspective view of an apparatus 130a and features of the housing 132 designed to receive the apparatus 130a, in accordance with aspects of the present disclosure. As shown, the apparatus 130a may include a base 138. In order to receive the base 138, the housing 132 may include a guide 140a and a guide 140b. The guides 140a and 140*b* (e.g., rails, guide rails) may combine to include a shape corresponding to the shape of the base 138. As shown in FIG. 5, the guides 140*a* and 140*b* are non-parallel, creating a tapered set of bases that conform or correspond to the tapered body of the base 138. However, it should be noted that the guides 140*a* and 140*b* may be oriented differently (e.g., parallel) based on a different shape of the base 138.

In order to affix the base 138 between the guides 140*a* and 140*b*, the apparatus 130*a* may further include a fastener 142 designed to pass through an opening 144 of the housing 132. In one or more implementations, the fastener 142 takes the form of a pin. For example, the fastener 142 may include a shear pin designed to shear, or break, under certain conditions, such as from impact from the housing 132. As non-limiting examples, the fastener 142 may be formed from one or more polymer-based materials (e.g., plastic).

The apparatus 130*a* may further include a connector 146 designed to secure with a vehicle (e.g., vehicle 100 shown in FIG. 1). The connector 146 may be rotated (e.g., shown in a counterclockwise direction) to move the connector 146 along the Z-axis. In one or more implementations, the connector 146 takes the form of a tolerance compensator. In this regard, by rotating the connector 146, the connector 146 may engage a fastener (not shown in FIG. 5) coupled to a vehicle, including a front end module of the vehicle. The connector 146 may include an opening 148. In order to receive a threaded fastener, the opening 148 may include a threaded opening for threaded engagement with the fastener. The connector 146 may form a joint (e.g., floating joint) at a desired location. Beneficially, the apparatus 130*a* may be separated from the front end module by a gap, and the connector 146 may be displaced to couple with the fastener and close the gap.

FIG. 6 illustrates a side view of an apparatus 130*a* positioned in the guides 140*a* and 140*b*, in accordance with aspects of the present disclosure. As shown, the base 138 includes an opening 149. When the apparatus 130*a* is positioned between the guides 140*a* and 140*b*, the opening 149 aligns with the opening 144 of the housing 132. As a result, the fastener 142 may be inserted into both the opening 149 of the base 138 and into the opening 144 of the housing 132. By positioning the fastener 142 in the opening 144, the fastener 142 may shear based on displacement of the housing 132 that causes the housing 132 to move relative to the apparatus 130*a* and contact the fastener 142. It should be noted that the apparatus 130*a* may be representative of other apparatus, such as the apparatus 130*b* (shown in FIG. 4), and other apparatus shown and/or described herein may include any features shown and/or described for the apparatus 130*a*. Also, the housing 132 may include additional guides similar to the guides 140*a* and 140*b* to receive the apparatus 130*b*.

Figure 7:
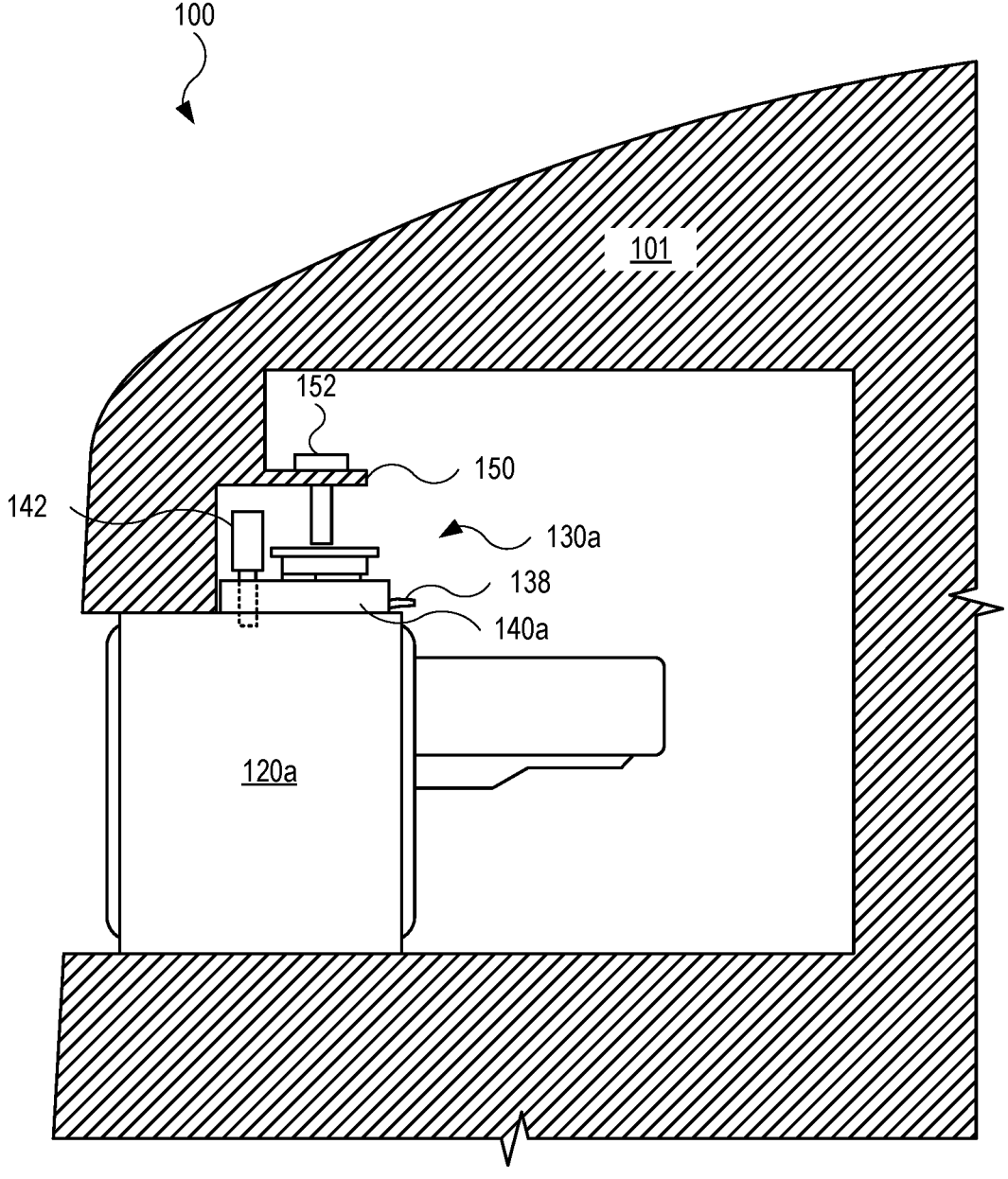
FIG. 7 illustrates a partial cross sectional view of an apparatus and a lamp in a vehicle, in accordance with aspects of the present disclosure.
Figure 8:
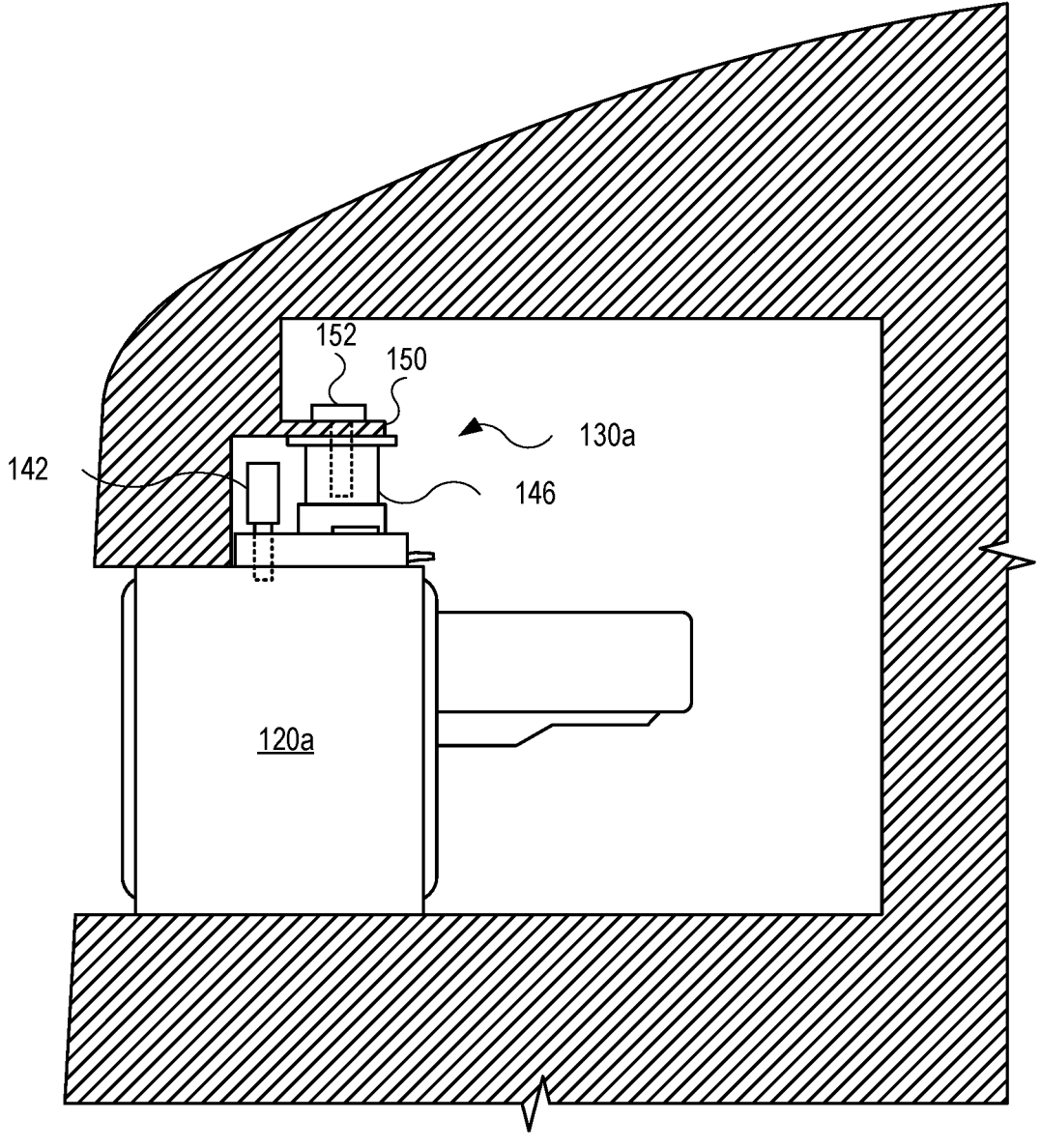
FIG. 8 illustrates a partial cross sectional view of an apparatus and a lamp in a vehicle, showing the compensator coupled to a fastener, in accordance with aspects of the present disclosure.
Figure 9:
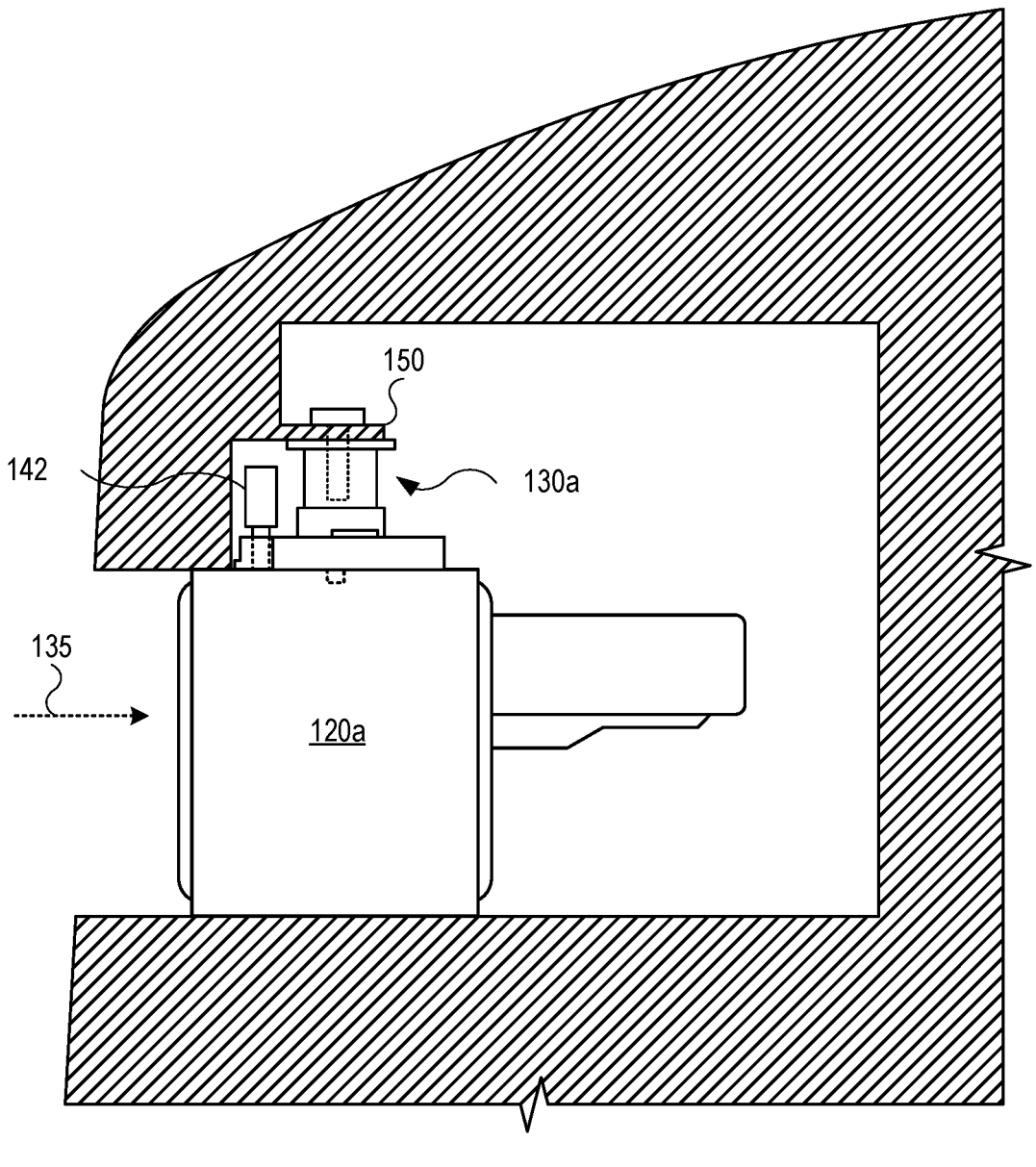
FIG. 9 illustrates a partial cross sectional view of an apparatus and a lamp in a vehicle, showing movement of the lamp in response to an impact event, in accordance with aspects of the present disclosure.

FIG. 7. FIG. 8, and FIG. 9 illustrate exemplary displacement of lamp 120*a* in response to impact by an external force. The displacement of the lamp 120*a* shown and/or described in FIG. 7, FIG. 8, and FIG. 9 may be representative of any lamp shown and/or described herein. Also, while a single apparatus (e.g., apparatus 130*a*) is shown in FIG. 7, FIG. 8, and FIG. 9, the apparatus 130*a* and associated features shown and/or described in FIG. 7, FIG. 8, and FIG. 9 may be representative of any apparatus shown and/or described herein.

FIG. 7 illustrates a partial cross sectional view of the apparatus 130*a* and the lamp 120*a* in the vehicle 100, in accordance with aspects of the present disclosure. The vehicle 100 may include a vehicle body 101 that includes a module 150 (e.g., front end module). As shown, the module 150 holds a fastener 152 (e.g., module fastener). Additionally, the base 138 of the apparatus 130*a* is located between the guide 140*a* and the guide 140*b* (not shown in FIG. 7).

FIG. 8 illustrates a partial cross sectional view of the apparatus 130*a* and the lamp 120*a* in the vehicle 100, showing the connector 146 coupled to the fastener 152, in accordance with aspects of the present disclosure. The apparatus 130*a* may secure the lamp 120*a* with the module 150. In this regard, the connector 146 may be rotated to extend in a direction toward the fastener 152. As shown, the displacement of the connector 146 closes the gap between the apparatus 130*a* and the module 150, and creates a joint between the apparatus 130*a* and the module 150.

FIG. 9 illustrates a partial cross sectional view of the apparatus 130*a* and the lamp 120*a* in the vehicle 100, showing movement of the lamp 120*a* in response to an impact event, in accordance with aspects of the present disclosure. As shown, the force from the impact is in the direction of the arrow 135. Based on the position and coupling with the lamp 120*a* as well as the position of the guide 140*a* and the guide 140*b* (not shown in FIG. 9), the apparatus 130*a* may allow displacement of the lamp 120*a*. For example, the force causes displacement of the lamp 120*a*, which in turn causes the housing 132 to engage and shear the fastener 142. When the fastener 142 shears, the apparatus 130*a* releases the lamp 120*a*. However, based on the coupling with the module 150, the apparatus 130*a* remains fixed.

The apparatus 130*a* may provide several benefits and advantages. For example, by allowing displacement of the lamp 120*a* due to an impact event, the apparatus 130*a* may limit or prevent injury to a person or object that causes the impact to the lamp 120*a*. Additionally, the lamp 120*a* may avoid damage and may be reinstalled. In some instances, the fastener 142 is the only component requiring replacement.

Figure 10A:
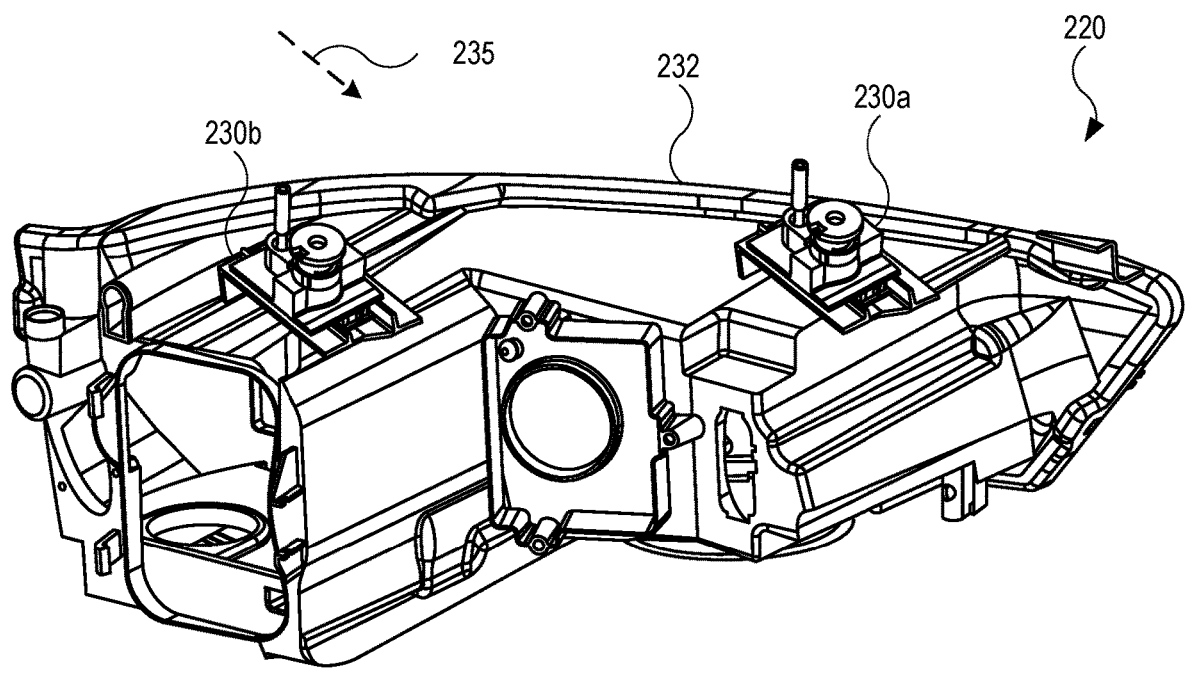
FIG. 10A and FIG. 10B illustrate rear perspective views of alternate examples of housings for headlamps, showing apparatuses coupled to the housing in different orientations, in accordance with aspects of the present disclosure.
Figure 10B:
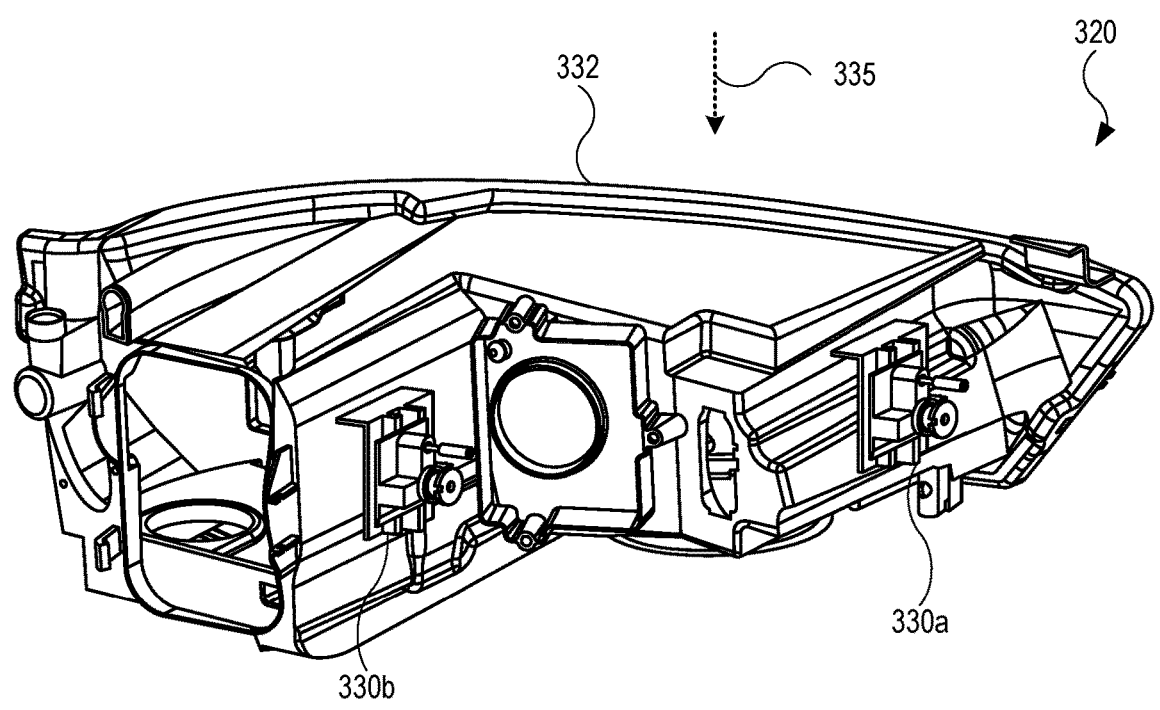

FIG. 10A and FIG. 10B illustrate alternate examples of housings for lamps, showing apparatuses coupled to the housing in different orientations, in accordance with aspects of the present disclosure. The housings and apparatus shown and/or described in FIG. 10A and FIG. 10B may include any features previously described for a housing (of a lamp) and an apparatus, respectively.

FIG. 10A illustrates a rear perspective view of an alternate example of a housing 232 for a lamp 220, showing an apparatus 230*a* and an apparatus 230*b* secured to the housing 232 in a different exemplary orientation, in accordance with aspects of the present disclosure. As shown, the apparatus 230*a* and the apparatus 230*b* are oriented diagonally (e.g., rotated approximately in the range of 25 to 60 degrees) with respect to the apparatus 130*a* and 130*b*, respectively, shown in FIG. 4. In this regard, the housing 232 may include guides (shown, not labeled) oriented in a manner similar to that of the apparatus 230*a* and the apparatus 230*b*. As a result, impact due to a force in a direction of the arrow 235 (e.g., a diagonal) may cause the housing 232 to move in the direction of the arrow 235. Based on the position and orientation of the apparatus 230*a* and the apparatus 230*b*, the lamp 220 may be equipped to move based on a side/lateral impact event to the lamp 220.

FIG. 10B illustrates a rear perspective view of an alternate example of a housing 332 for a lamp 320, showing an apparatus 330*a* and an apparatus 330*b* secured to the housing 332 in yet another exemplary orientation, in accordance with aspects of the present disclosure. As shown, the apparatus 330*a* and the apparatus 330*b* are oriented vertically (e.g., rotated approximately 90 degrees) with respect to the apparatus 130*a* and 130*b*, respectively, shown in FIG. 4. In this regard, impact due to an external load in a direction of the arrow 335 may cause the housing 332 to move in the direction of the arrow 335. Based on the position and orientation of the apparatus 330*a* and the apparatus 330*b*, the lamp 320 may be equipped to move based on a front hood impact to the lamp 320.

Figure 11:
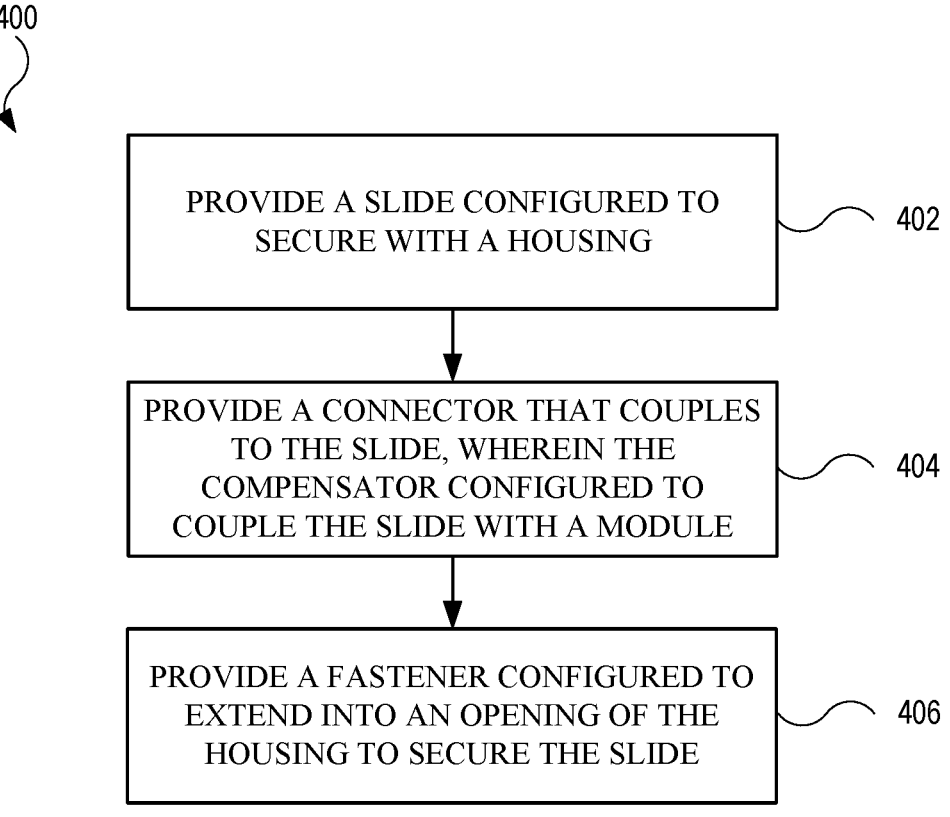
FIG. 11 illustrates a flow diagram showing an example of a process that may be carried out for coupling an apparatus to a housing, in accordance with implementations of the subject technology.

FIG. 11 illustrates a flow diagram showing an example of a process 400 that may be carried out for coupling an apparatus to a housing, in accordance with implementations of the subject technology. For explanatory purposes, the process 400 is primarily described herein with reference to an apparatus, such as the apparatus 130*a* and the apparatus 130*b* shown in FIGS. 3 and 4, as a non-limiting example. However, the process 400 is not limited to the apparatus 130*a* and the apparatus 130*b*, and one or more blocks (or operations) of the process 400 may be performed by one or more other structural components of other suitable moveable apparatuses, devices, or systems. For example, the process 400 may be applicable to the apparatus 230*a* and the apparatus 230*b* shown in FIG. 10A or the apparatus 330*a* and the apparatus 330*b* shown in FIG. 10B. Further for explanatory purposes, some of the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, a base is provided that is configured to couple with a housing. The base may be shaped to fit between guides of the housing. For example, the base may include a tapered base that fits between non-parallel guides.

At block 404, a compensator is provided that couples to the base. The compensator may be configured to couple the base with a module. For example, the compensator can be actuated (e.g., rotated) away from the base toward a fastener to couple (e.g., threaded engagement) with the fastener, thus coupling the apparatus with a front end module of a vehicle.

At block 406, a fastener is provided that is configured to extend into an opening of the housing to secure the base. The base may be secured between the guides of the housing. The fastener may take the form of a pin (e.g., shear pin) designed to shear in response to contact with the housing. For example, an impact event to the housing may cause displacement of the housing, which in turn causes the housing to contact and shear the fastener.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements.

However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. An apparatus, comprising:

a base comprising a tapered body that includes a shape corresponding to i) a first guide of a housing and ii) a second guide of the housing, the base comprising a first opening;

a connector disposed on the base, the connector configured to couple with a module; and a fastener configured to extend into the first opening and into a second opening formed in the housing to couple the base with the housing, wherein in response to an applied force, the fastener is configured to break and release the housing from the base.

2. The apparatus of claim 1, wherein the fastener comprises a pin configured to break in response to the applied force.

3. The apparatus of claim 2, wherein the pin is configured to break in response to contact with the housing.

4. The apparatus of claim 1, wherein the base causes the housing to move in a direction of the applied force.

5. The apparatus of claim 1, wherein the connector is configured to rotate and couple with a module fastener coupled to the module.

6. The apparatus of claim 1, wherein in response to the tapered body of the base being positioned the first guide, the first opening of the base is aligned with the second opening of the housing.

7. The apparatus of claim 1, wherein the housing is configured to carry a light source.

8. The apparatus of claim 1, wherein the tapered body is configured to slide between the first guide and the second guide.

9. A vehicle, comprising:

a front end module;

a housing comprising:

a guide comprising a first rail and a second rail, wherein the second rail is non-parallel with respect to the first rail, and an opening positioned between the first rail and the second rail; and an apparatus, comprising:

a tapered base configured to couple with the housing, wherein the first rail and the second rail are configured to receive the tapered base, a connector coupled to the tapered base, the connector configured to couple with the housing with the front end module, and a fastener configured to extend into the opening to couple the tapered base with the housing, wherein in response to an applied force, the fastener is further configured to break.

10. The vehicle of claim 9, wherein the housing further comprises a light source.

11. The vehicle of claim 9, the fastener is further configured to release the housing from the tapered base.

12. The vehicle of claim 11, wherein the fastener is a pin configured to break in response to the applied force.

13. The vehicle of claim 12, wherein the pin is configured to break in response to contact with the housing.

14. The vehicle of claim 11, wherein the tapered base causes the housing to move in a direction of the applied force.

15. The vehicle of claim 9, further comprising a second opening formed in the tapered base.

16. The vehicle of claim 15, wherein the fastener is configured to be inserted into the second opening.

17. A method, comprising:

providing a base comprising a tapered body configured to slide between i) a first guide of a housing and ii) a second guide of the housing, the base comprising a first opening;

providing a connector that is disposed on the base, wherein the connector configured to couple the base with a module; and providing a fastener configured to extend into the first opening and into a second opening of the housing to couple the base with the housing, wherein in response to an applied force, the fastener is configured to break and release the housing from the base.

18. The method of claim 17, wherein the housing is configured to carry a light source.

19. The method of claim 17, further comprising rotating the connector to couple with a module fastener coupled to the module.

20. The method of claim 17, wherein providing the base comprises forming the base to extend between a first rail and a second rail of the housing.

\* \* \* \* \*